United States Patent [19]
Keersmaekers

[11] Patent Number: 5,616,156
[45] Date of Patent: Apr. 1, 1997

[54] DEVICE FOR THE CLEANSING OF THE FLUE GASES FROM WASTE INCINERATION INSTALLATIONS

[76] Inventor: Marc Keersmaekers, Dompel 19, 2200 Herentals, Belgium

[21] Appl. No.: 418,351

[22] Filed: Apr. 7, 1995

[30] Foreign Application Priority Data

Apr. 11, 1994 [BE] Belgium .................... 9400371

[51] Int. Cl.$^6$ .................................................. B01D 50/00
[52] U.S. Cl. .................. 55/269; 55/296; 55/315; 55/319; 55/430; 96/218
[58] Field of Search ............... 55/267, 269, 315, 55/319, 342, 430, 459.1, 296, DIG. 30; 96/188, 218; 95/271, 288, 291

[56] References Cited

U.S. PATENT DOCUMENTS

| | | | |
|---|---|---|---|
| 3,765,153 | 10/1973 | Grey | 55/319 |
| 3,842,461 | 10/1974 | Wurster | 55/319 |
| 4,053,293 | 10/1977 | Combs | 55/319 |
| 4,339,249 | 7/1982 | Berkestad et al. | 55/269 |
| 4,682,549 | 7/1987 | Hall | 55/269 |
| 4,704,972 | 11/1987 | Marchand | 55/269 |
| 4,932,334 | 6/1990 | Patte et al. | 55/269 |
| 5,141,537 | 8/1992 | Te | 55/342 |

Primary Examiner—C. Scott Bushey
Attorney, Agent, or Firm—William A. Drucker

[57] ABSTRACT

The device is provided with a cyclone connected to the incineration installation intended for the collection of flyash, a heat exchanger to which the cyclone is connected and intended for the reduction of the temperature of the collected flue gases and the reheating of the cleaned flue gases, a gravitation chamber with a rotating scraper and intended for slowing the speed of the incoming flue gases and the precipitation and removal of the flyash, a cooling chamber connected to the gravitation chamber and intended for the refrigeration of the incoming flue gases, where provisions are made for the removal of the condensate from the refrigerated flue gases to a water treatment installation, and an outlet for the removal of the treated and cooled flue gases.

13 Claims, 2 Drawing Sheets

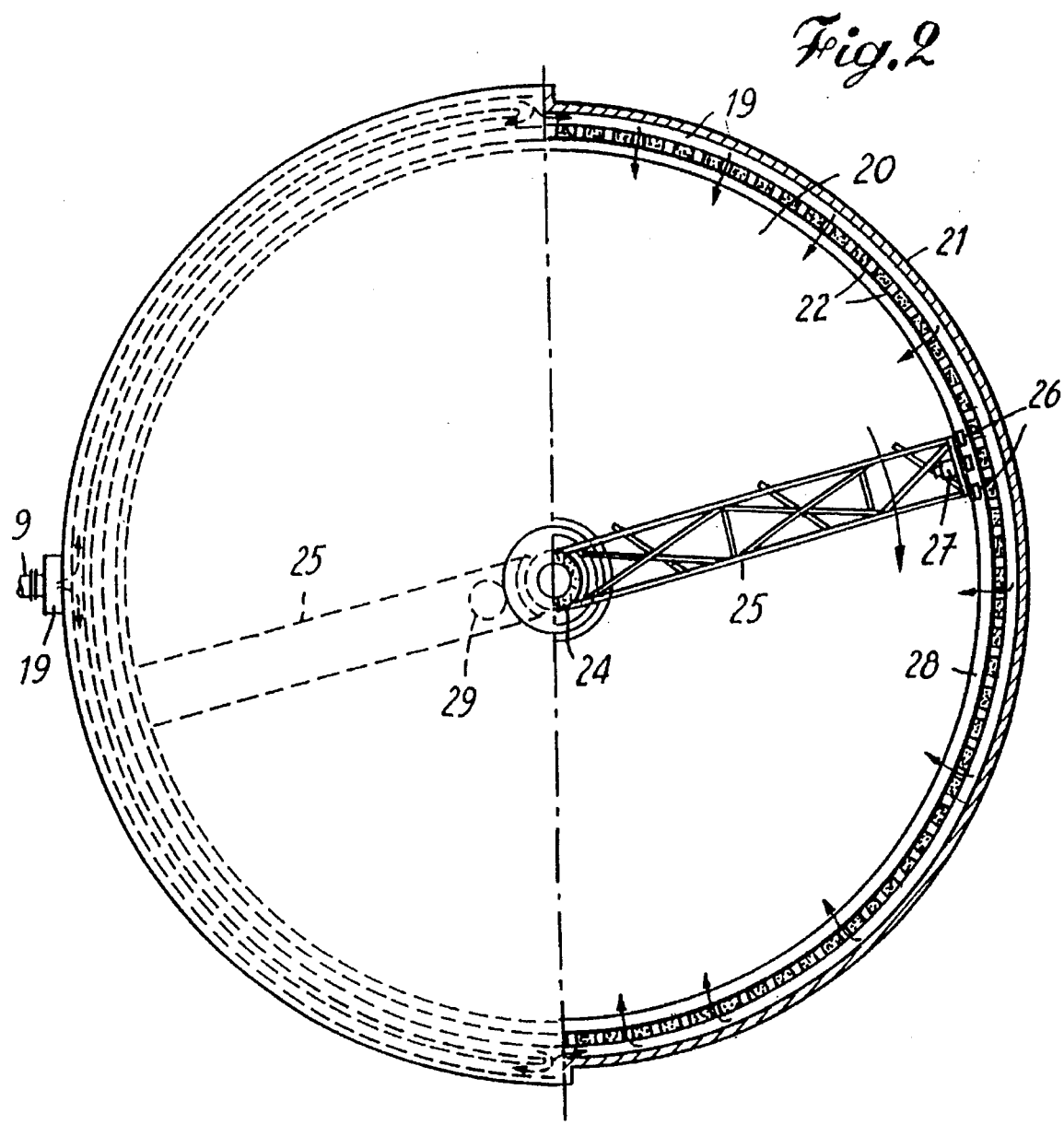

ved to be 5,616,156

DEVICE FOR THE CLEANSING OF THE FLUE GASES FROM WASTE INCINERATION INSTALLATIONS

BACKGROUND OF THE INVENTION

1. Field of the Invention

The invention is for a device for the cleansing of the severely polluted flue gases which arise in waste incineration installations before these enter the atmosphere.

2. Description of the Prior Art

Known cleansing installations are installations provided with electrostatic filters and means for scrubbing the polluted flue gases. A major disadvantage of these is that large quantities of water are needed for the cleansing operation, which water becomes polluted with heavy metals during the scrubbing of the flue gas and must in turn be treated before being discharged into the environment.

Another disadvantage is that the cost price and maintenance costs of such installations are very high.

SUMMARY OF THE INVENTION

In order to cope with these disadvantages a device in accordance with the principal characteristic of tile invention has been realized whereby the flyash together with the heavy metals is removed in solid form from the flue gases, the remaining part of the flue gases is cooled, the condensate of this is removed together with the heavy metals in liquid form via a water treatment installation and the remaining cleaned quantity of flue gases is expelled into the atmosphere. This is accomplished in accordance with the invention by a cyclone for the collection of a large part of the flyash from the flue gases, the cyclone being connected to the incineration installation, a heat exchanger to which the cyclone is connected and intended for the reduction of the temperature from the flue gases, a gravitation chamber to which the heat exchanger is connected and intended for reducing the speed of the incoming flue gases and for the gravitational separation and precipitation of the flyash from the flue gases, a scraper installed against the bottom of the gravitation chamber and intended for scraping together and removing the flyash precipitated in the gravitation chamber, driving apparatus for propelling the scraper, an extraction pipe provided in the bottom of the gravitation chamber and intended for the removal of the flyash, an outlet with holes provided in the gravitation chamber for guiding the rising flue gases out, a cooling chamber provided with cooling elements connected to the gravitation chamber and intended for the refrigeration of the incoming flue gases, heating elements provided in the cooling chamber for extracting a condensate from the frozen flue gases, a catchment sump provided in the floor of the cooling chamber for the collection of the condensate, a pump for removing the condensate in the catchment sump to a water treatment installation and an extractor connected to the cooling chamber and intended for the removal of the treated and cooled flue gases in the cooling chamber.

BRIEF DESCRIPTION OF THE DRAWINGS

By way of example, and without attempting to be exhaustive in any way, a more detailed description of a preferred embodiment of the device in accordance with the invention is given below. This description refers to the attached drawings, where:

FIG. 2 shows a section along the line 2—2 in FIG. 1.

DETAILED DESCRIPTION OF THE INVENTION

Figure 1:
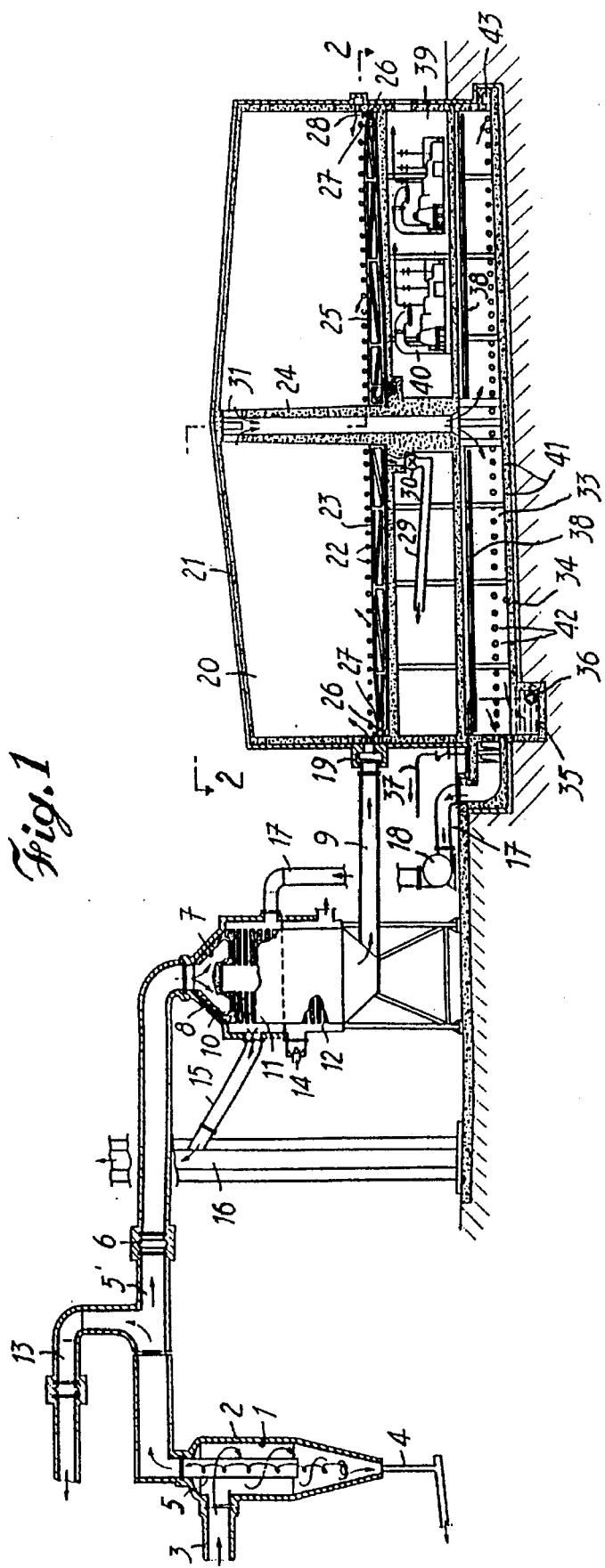
FIG. 1 is a vertical section through a cyclone with a heat exchanger connected thereto and with a gravitation chamber connected to the heat exchanger and cooling chamber.

In FIGS. 1 and 2 a cyclone 1 can be seen which is provided with an insulating mantle 2 and in which emerges a pipe 3 through which the dirty flue gases from an incineration installation in which all kinds of waste are burnt enter the cyclone. In this a large part of the flyash is removed from the flue gases and carried away via the extraction pipe 4 installed beneath the cyclone. The partially cleansed flue gases are carried through a collector pipe 5 which leaves the cyclone and which is connected to a pipe 5', which has a side branch 13 and an expansion bellows 6, for the removal of the recycled flue gases and leading to a heat exchanger 7 provided with an insulating mantle 8. The flue gases enter at a temperature of close to 250° C. and leave the heat exchanger at a temperature of close to 55° C. through a pipe 9. To this end the heat exchanger is provided with an axial duct system 10 to cool the flue gases from 250° C. and with a radial duct system 11 to heat the cleansed flue gases to between 100° C. and 110° C. and with a second radial duct system 12 with a fan 14 to adjust the temperature of the flue gases to 55° C. The outlet of the radial duct system 11 is connected at one end to an exhaust pipe 15 leading to a chimney 16 and at the other end to a pipe 17 provided with a flue gas fan 18 as a result of which the flue gases cooled and cleansed by the device described below flow into the radial duct system-11 of the heat exchanger 7 in order to: cool the flue gases coming from the cyclone 1. The pipe 9 is connected to an annular duct 19 provided around the lowest part of a cylindrical gravitation chamber 20, equipped with an insulating mantle 21. This annular duct is connected to the gravitation chamber by means of openings 22 provided in the wall of the gravitation chamber 20. The floor 23 of this gravitation chamber pitched towards the centre where a hollow column 24 is installed. A double-armed scraper 25 is mounted so that it can rotate around this hollow column and against the bottom 23. Each end of this scraper is provided with driving wheels 26 driven slowly by an electrical motor 27 mounted on the scraper and which run in a rail 28 mounted around the inside wall of the gravitation chamber.

The solid particles are precipitated on the floor 23 of said chamber by gravity from the flue gases entering the gravitation chamber 20 through the openings 22 at a speed of virtually 3 mm/sec. The insulating mantle 21 prevents the flue gases from cooling and condensing. The very slowly rotating scraper 25 transports the deposited flyash containing solid heavy metals to the centre of the floor 23 of the gravitation chamber 20 before being removed via an extraction pipe 29 provided with a rotating lock 30 to prevent the penetration of dead air. The upper section of the hollow column 24 is provided with openings 31 through which the flue gases are carried away via the column 24 downwards into a cooling chamber 33 in which they are severely cooled to a temperature of close to −1° C. At this temperature acid components, such as HCl, HF and $SO_2$, and heavy metals present in gas phase, such as Hg, condense and the condensate is collected by means of the pitched floor 34 of the cooling chamber 33 in a collection sump 35, from which the condensate is carried with the aid of an immersion pump 36 and a pipeline 37 to a water treatment installation. In order to bring about said cooling, several cooling elements 38 are installed in the upper section of the cooling chamber 33 which are supplied by cooling means 40 installed between the gravitation chamber 20 and the cooling chamber 33 and the heat derived from which can be used for heating other spaces. In order to prevent the condensate from freezing heating elements 41 can be built into the said floor 34. The remaining cleansed flue gases are carried via the openings 42 provided in the wall of the cooling chamber 34 and which emerge into an annular duct 43 away to the pipe 17 provided for this purpose through which these cleansed gases pass into the atmosphere via the heat exchanger 7 and the chimney 16.

It goes without saying that the type, the arrangement, the form and dimensions of the parts described above may differ according to the desired purpose and that the device described above could be added to with other accessories which could improve its practical functioning.

I claim:

1. Device for the cleansing of flue gases from waste incineration installations, comprising:

(a) a cyclone separator connected to said incineration installation for the collection of a large portion of flyash from the flue gases to provide cleaned flue gases and having an extraction pipe, (b) a heat exchanger connect to said cyclone separator for reduction of the temperature of the cleaned flue gases collected from the cyclone separator and the reheating of the cleaned flue gases, (c) a gravitation chamber connected to said heat exchanger for reducing a speed of the incoming cleaned flue gases and for the gravitational separation and precipitation of the flyash from the cleaned flue gases, (d) a scraper installed against a bottom of said gravitation chamber for scraping together and removing the flyash precipitated in the gravitation chamber, (e) driving means for propelling said scraper, (f) an extraction pipe provided in the bottom of said gravitation chamber for the removal of the flyash, (g) an outlet with holes provided in said gravitation chamber for guiding rising flue gases out, (h) a cooling chamber having an outlet pipe and provided with cooling elements connected to said gravitation chamber for the refrigeration of the incoming cleaned flue gases, (i) heating elements provided in the cooling chamber for extracting a condensate from the refrigerated incoming cleaned flue gases, (j) a catchment sump provided in a floor of the cooling chamber for the collection of the condensate, (k) a pump for removing the condensate in the catchment sump to a water treatment installation, and (l) an extractor connected to the cooling chamber and intended for the removal of the cleaned and cooled flue gases in the cooling chamber.

2. Device as defined in claim 1, wherein an inlet pipe of the cyclone connected to the incineration installation emerges into the cyclone by means of a distribution pipe, underneath the cyclone is connected to an outlet pipe for the removal of a large part of the flyash from the flue gases, at the top the cyclone is connected to a collector pipe and a pipe equipped with an expansion bellows for carrying the flue gases to the heat exchanger where the cyclone is equipped with an insulating mantle.

3. Device as defined in claim 1, wherein said device includes a chimney and wherein the heat exchanger is equipped with an axial duct system and a radial duct system which at one end is connected to the outlet pipe of the cooling chamber and at the other end to the chimney of the device, at the top the heat exchanger is connected to the cyclone separator and at the bottom to the gravitation chamber, where a second radial connection provided with a fan is provided in the heat exchanger.

4. Device as defined in claim 1, wherein the gravitation chamber is provided with an insulting mantle to prevent condensation.

5. Device as defined in claim 1, wherein the gravitation chamber is gently pitched to the center of same and that the outlet provided in the bottom of the gravitaion chamber comprises an opening with an extraction pipe provided at said center and on which a rotating lock is mounted in order to prevent the admission of dead air.

6. Device as defined in claim 1, wherein said gravitation chamber has a wall having an inner surface and wherein the scraper comprises a double arm rotating around a hollow column, said column being provided with openings which form the connection between the gravitation chamber and the cooling chamber, the free end of each arm being provided with two driving wheels driven by an electrical motor, said driving wheels running in a rail mounted against the inner surface of the wall of the gravitation chamber.

7. Device as defined in claim 1, wherein said gravitation chamber has a lowest part and wherein, around the lowest part of the gravitation chamber, an annular duct is provided which is connected to the heat exchanger and provided with openings passing through the wall of the gravitation chamber.

8. Device as defined in claim 1, wherein the gravitation chamber is situated above the cooling chamber and that between the two chambers there is a space for the installation of cooling means for the cooling elements in the cooling chamber.

9. Device as defined in claim 1, wherein said cooling chamber has a wall having openings therein and wherein, around the wall of the cooling chamber, an annular duct is provided, said duct being connected to the cooling chamber via the openings provided in the wall and connected to the outlet pipe for the removal of the cleansed and cooled flue gases.

10. Device as defined in claim 1, wherein the floor of the cooling chamber is pitched towards the catchment sump provided in the floor.

11. Device as defined in claim 1, wherein the catchment sump is provided with an immersion pump for the removal of the collected condensate.

12. Device as defined in claim 1, wherein said cooling chamber has an upper part and wherein the cooling elements are set up in the upper part of the cooling chamber.

13. Device as defined in claim 1, wherein the heating elements are installed in the floor of the cooling chamber.

* * * * *